' # (12) United States Patent
Gaedke et al.

(10) Patent No.: US 6,775,438 B1
(45) Date of Patent: Aug. 10, 2004

(54) ELECTRICAL INSULATION DEVICE WITH OPTOCOUPLER FOR BIDIRECTIONAL CONNECTING LINES

(75) Inventors: Klaus Gaedke, Hannover (DE); Herbert Schütze, Celle (DE)

(73) Assignee: Thomson Licensing S.A., Boulogne-Billancourt (FR)

( * ) Notice: Subject to any disclaimer, the term of this patent is extended or adjusted under 35 U.S.C. 154(b) by 371 days.

(21) Appl. No.: 10/031,582

(22) PCT Filed: Jul. 7, 2000

(86) PCT No.: PCT/EP00/06476

§ 371 (c)(1),
(2), (4) Date: Jan. 18, 2002

(87) PCT Pub. No.: WO01/06680

PCT Pub. Date: Jan. 25, 2001

(30) Foreign Application Priority Data

Jul. 19, 1999 (DE) .......................................... 199 33 135

(51) Int. Cl.[7] ............................. G02B 6/26; G02B 6/42; H04B 10/00
(52) U.S. Cl. ............................. 385/42; 385/24; 398/138; 398/139; 398/141
(58) Field of Search .......................... 385/15–52, 88–94; 398/135–214

(56) References Cited

U.S. PATENT DOCUMENTS

| 4,634,877 A | * | 1/1987 | Wills | ............................ 250/551 |
| 5,661,583 A | * | 8/1997 | Nhu | ............................ 398/141 |
| 5,663,819 A | | 9/1997 | Lewis | ........................... 359/118 |
| 6,556,750 B2 | * | 4/2003 | Constantino et al. | ......... 385/41 |

FOREIGN PATENT DOCUMENTS

| DE | 3329570 A1 | 3/1985 | ............ H04B/9/00 |
| DE | 4444307 A1 | 6/1996 | ............ H04L/25/26 |
| EP | 905 924 A2 | 3/1999 | ............ H04B/10/10 |

OTHER PUBLICATIONS

Maury Wright, Technical Editor, EDN Design Feature, *USB and IEEE 1394: "Pretenders, Contenders, or Locks for Ubiquitous Desktop Deployment?"*, Apr. 25, 1996, pp. 79–91.
Search Report *.

* cited by examiner

*Primary Examiner*—Akm Enayet Ullah
*Assistant Examiner*—Jerry T Rahll
(74) *Attorney, Agent, or Firm*—Joseph S. Tripoli; Ronald H. Kurdyla; Jeffrey M. Navon

(57) ABSTRACT

An electrical insulation device for bidirectional connecting lines is proposed which operates reliably at high frequencies and can be integrated easily on a chip. In accordance with a first embodiment, for the purpose of electrical isolation, two separate optocouplers are provided per bidirectional connecting line. A control unit evaluates the control signals which are output by one of the two circuit units, and thereupon activates one of the two optocouplers while the other optocoupler is simultaneously deactivated, in order, in this way, to allow transmission of signals via the associated connecting line in one direction. In a second embodiment of the invention, only a single optocoupler is provided per bidirectional connecting line. The control unit is provided in this solution as well, except that in this case it changes over the effective direction of the optocoupler by means of corresponding circuit components, thereby once again achieving transmission of signals via the associated connecting line in one direction.

5 Claims, 3 Drawing Sheets

ELECTRICAL INSULATION DEVICE WITH OPTOCOUPLER FOR BIDIRECTIONAL CONNECTING LINES

This application claims the benefit under 35 U.S.C. §365 of International Application PCT/EP/EP00/06476, filed Jul. 7, 2000, which claims the benefit of German Application No. 19933135.0, filed Jul. 19, 1999.

The invention relates to an electrical insulation device for bidirectional connecting lines/bus lines with the use of optocouplers.

PRIOR ART

The invention is based on an electrical insulation device for bidirectional connecting lines of the generic type of the independent claims 1 and 2. If a plurality of independent apparatuses are interconnected via lines, then it is often necessary to provide electrical insulation between the interconnected components. This applies particularly whenever the connected apparatuses are installed e.g. in a manner distributed in a building. This is because in this situation relatively large potential differences between the apparatuses can occur, which are caused e.g. by different potentials on the power supply lines. Such potential differences may occur in the range from a few millivolts up to a number of volts. Potential differences of this type may be present with greater or lesser stability. They may vary e.g. in accordance with the instantaneous total power consumption in the building. However, they may also fail momentarily, with destructive effect, e.g. due to a lightning strike in the building itself or in the vicinity of the building.

In the less severe case, the data signals and/or control signals which run via the bus connections are merely corrupted. However, they can lead to the destruction of the connected circuit sections.

The problem of undesirable earth loops, caused by the connecting lines, frequently arises. By way of example, induced current can flow through the cable screen of the bus connection and likewise corrupt the transmitted data signals. If the induced potential difference is large enough, persons who happen to be handling the corresponding bus connection cable could also be injured.

Therefore, the requirement for complete electrical isolation of the stations which are connected to one another by lines is necessary.

One example of a bus system in which electrical isolation of the components which are connected to one another is required is the IEEE 1394 bus standard, which has recently acquired increasing importance. The exact designation of this bus standard reads as follows: IEEE Std 1394–1995, "IEEE Standard for a high performance serial bus" of 12.12.1995.

What is involved is a bus system containing two data line pairs and also two power supply lines earth and $V_{cc}$ and also a cable screen in the bus connection cable. The two data line pairs allow synchronous serial data transmission. What is probably one of the most outstanding properties of the bus system is that data transmission is possible at very high data rates of 100 megabits per second up to 400 megabits per second.

With regard to the realization of electrical isolation of stations which are connected to one another via the bus, two explicit circuit realizations are specified in Appendix J.6 of the abovementioned standard. In both cases, electrical isolation is performed between the data link layer module and the physical layer module. A transformer connected up appropriately with resistors and capacitors is used for the electrical isolation in one case, and capacitive decoupling is provided for the electrical isolation in the other case. These solutions have assumed, however, that the data link layer module and the physical layer module are present as separate chips. It has been shown in retrospect that the capacitive isolation of the two modules does not constitute a reliable solution in practice at the high frequencies. Instances of signal corruption and interfering irradiation have occurred. In the case of electrical insulation using a transformer, moreover, there is the disadvantage that this solution can no longer be used if the data link layer module and the physical layer module of the bus interface are intended to be integrated on a single chip.

Furthermore, it is known to use so-called optocouplers for the electrical isolation of circuit units which are connected to one another.

INVENTION

The object of the invention is to specify an electrical insulation device in particular for bidirectional connecting lines which operates reliably even at very high frequencies and can be integrated very easily on a chip.

The object is achieved by means of the features of the independent claims 1 and 2. In accordance with a first embodiment of the invention, the electrical insulation device for bidirectional connecting lines comprises two separate optocouplers per bidirectional connecting line and a control unit, which generates switching signals in a manner dependent on control signals output by one of the two circuit units, which switching signals, via corresponding switches, activate one of the two optocouplers and deactivate the other optocoupler, and thus allow transmission of signals via the connecting line in one direction. This solution does not require poorly integrable components such as transformers. Moreover, the aforementioned control unit can be constructed in a simple manner and can be readily integrated on a chip.

The second solution according to the invention in accordance with claim 2 manages with just one optocoupler per bidirectional connecting line. This is achieved by modifying the control unit in such a way that, in a manner dependent on the control signals output by one of the two circuit units which are connected to one another, the said control unit changes over the effective direction of the optocoupler with regard to the associated connecting line. In this case, it is necessary merely to provide two more switches for the switching operations. The implementation of such switches does not constitute a problem for the chip design. Therefore, this solution provides an electrical insulation device which can be integrated in a particularly simple manner.

Further advantageous developments and improvements of the devices mentioned in claims 1 and 2 are possible by virtue of the measures evinced in the dependent claims. In accordance with claim 4, the electrical insulation device may very advantageously be provided between a data link layer module and a physical layer module of a bus interface. If the solution is used in the case of an IEEE 1394 bus interface, then it suffices for the respective control unit to evaluate the control signals on the two control lines CTL [0:1] of the connecting bus between the two modules in order to activate the corresponding optocoupler or to change over the effective direction of the optocoupler.

Tristate drivers, in particular, may expediently be used as switches for the changeover between the optocouplers or for changing over the effective direction of the optocoupler, the said tristate drivers being driven correspondingly by the control unit.

DRAWINGS

The exemplary embodiments of the invention are illustrated in the drawings and are explained in more detail in the description below. In the figures.

Exemplary Embodiments of the Invention

Figure 1:
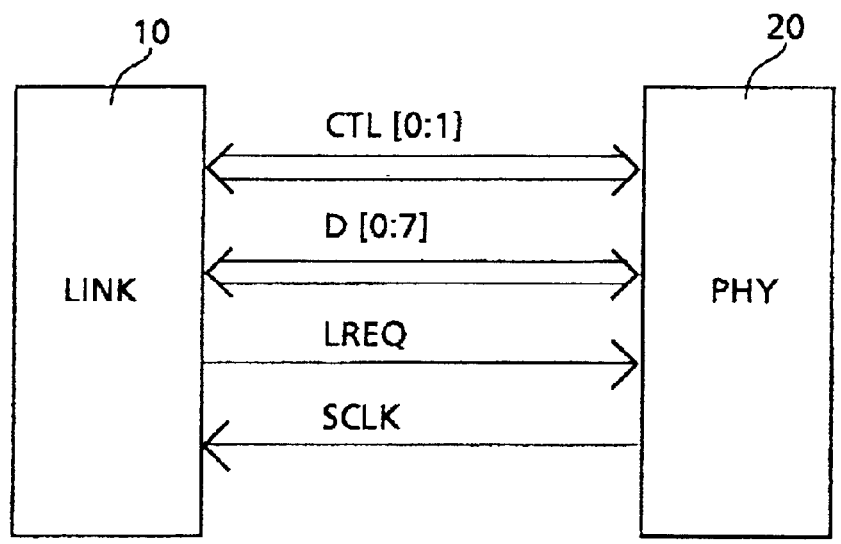
FIG. 1 shows the connecting lines between the data link module and the physical layer module in accordance with the IEEE 1394 standard.

The invention is explained using the example of an electrical insulation device for an IEEE 1394 bus interface. FIG. 1 shows the basic structure of an IEEE 1394 bus interface. The latter comprises the two modules data link layer module 10 and physical layer module 20. These two modules may be integrated on separate chips. It is desirable, however, for these modules to be integrated together on a single chip. The connection between the modules is effected by two bidirectional control lines CTL [0:1], and e.g. eight bidirectional data lines D[0:7], and also a unidirectional control line LREQ proceeding from the data link layer module, and also a control line SCLK for the system clock, proceeding from the physical layer module. For the sake of clarity, it is also mentioned that the connection to a further IEEE 1394 bus interface is effected via external connecting lines which are not illustrated and are connected to the physical layer module 20. Accordingly, the data link layer module 10 contains connections which connect the IEEE 1394 bus interface to an application unit. For further details regarding the structure and the method of operation of the modules data link layer module and physical layer module, reference is made to the IEEE 1394 standard already mentioned above.

Figure 2:
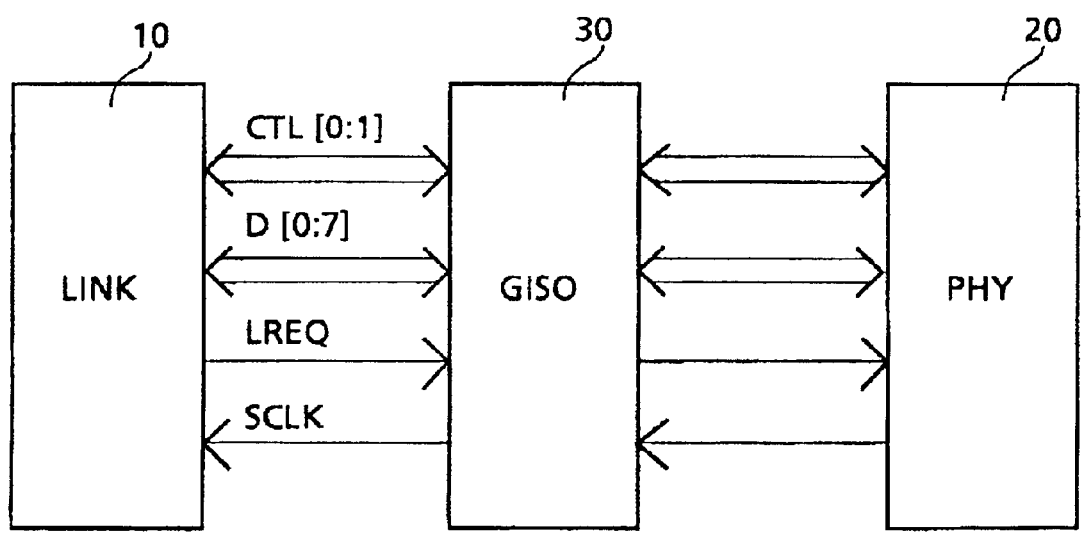
FIG. 2 shows the basic arrangement of the data link layer module, the electrical insulation device and the physical layer module.

In accordance with a proposal in the IEEE 1394 standard, the electrical insulation device 30 is provided between the data link layer module 10 and the physical layer module 20. This is illustrated in FIG. 2.

Figure 3:
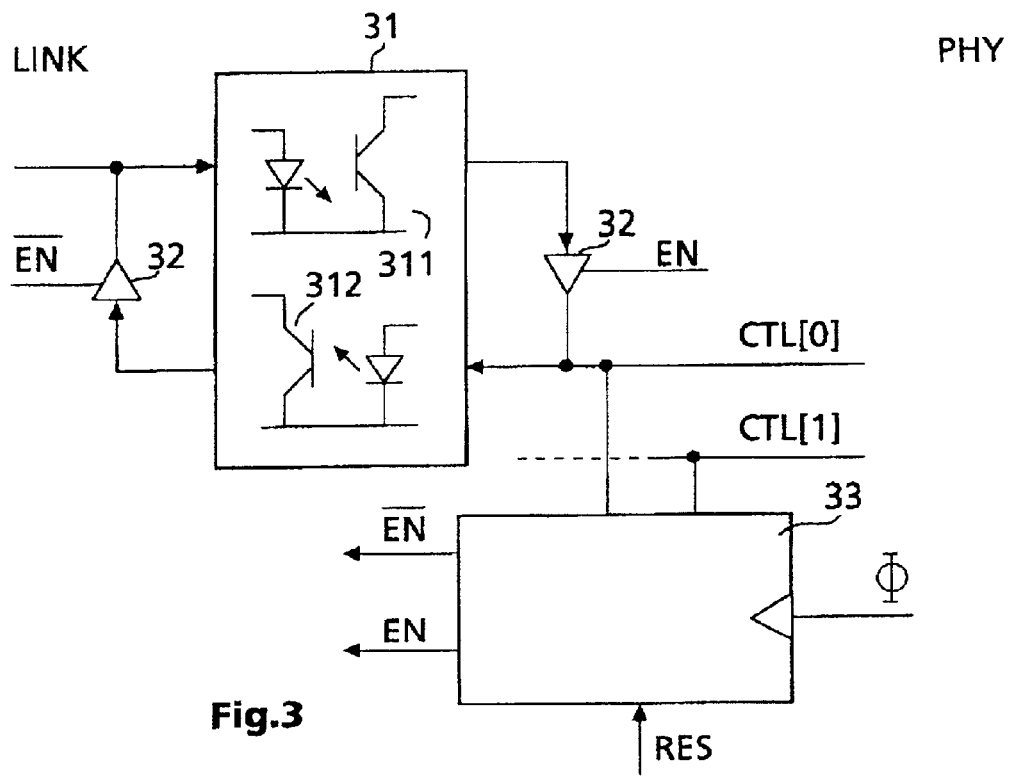
FIG. 3 shows the structure of the electrical insulation device in accordance with a first exemplary embodiment of the invention.

The structure of the electrical insulation device 30 is represented for a first exemplary embodiment in FIG. 3, in which an optocoupler unit is designated by the reference numeral 31. This unit contains two separate optocouplers 311, 312. The latter are reverse-connected in parallel, so that the light-emitting element of one optocoupler is connected to that part of the bidirectional connecting line which is connected to the data link layer module 10, and the light-emitting element of the other optocoupler is fed by that part of the connecting line which is connected to the physical layer module. In the example shown, the control line CTL[0] is connected to the optocoupler unit 31. Between the two optocouplers, a respective tristate driver 32 is connected on each side of the optocoupler unit 31. The two tristate drivers 32 illustrated are switched by complementary enable signals $\overline{EN}$ and EN. This will be discussed in more detail below. The tristate drivers 32 have the following effect. They can be switched either into a high-impedance state or into a low-impedance state in which they allow signals to pass. If we suppose that the tristate driver 32 on the side of the data link layer module 10 is switched in a low-impedance manner, a signal flow is possible via the control line CTL[0] proceeding from the physical layer module 20 via the lower optocoupler 312 to the data link layer module 10. The reverse signal flow is simultaneously inhibited, since the tristate driver 32 on the side of the physical layer module 20 is simultaneously switched in a high-impedance manner. In parallel with this, it is also possible, of course, to effect a switch-off of the upper optocoupler at the same time. In the reverse case, that is to say if the left-hand tristate driver 32 is switched in a high-impedance manner and the right-hand tristate driver 32 is switched in a low-impedance manner, a signal flow is possible from the data link layer module 10 to the physical layer module 20 via the control line CTL[0]. The changeover of the tristate drivers 32 is effected with the aid of the control signals EN and $\overline{EN}$ by the control unit 33. To that end, the control unit 33 evaluates the signal states on the two control lines CTL[0:1]. For complete functioning, the clock signal SCLK or a clock signal modified therefrom and also a reset signal are additionally fed to the control unit 33.

Figure 4:
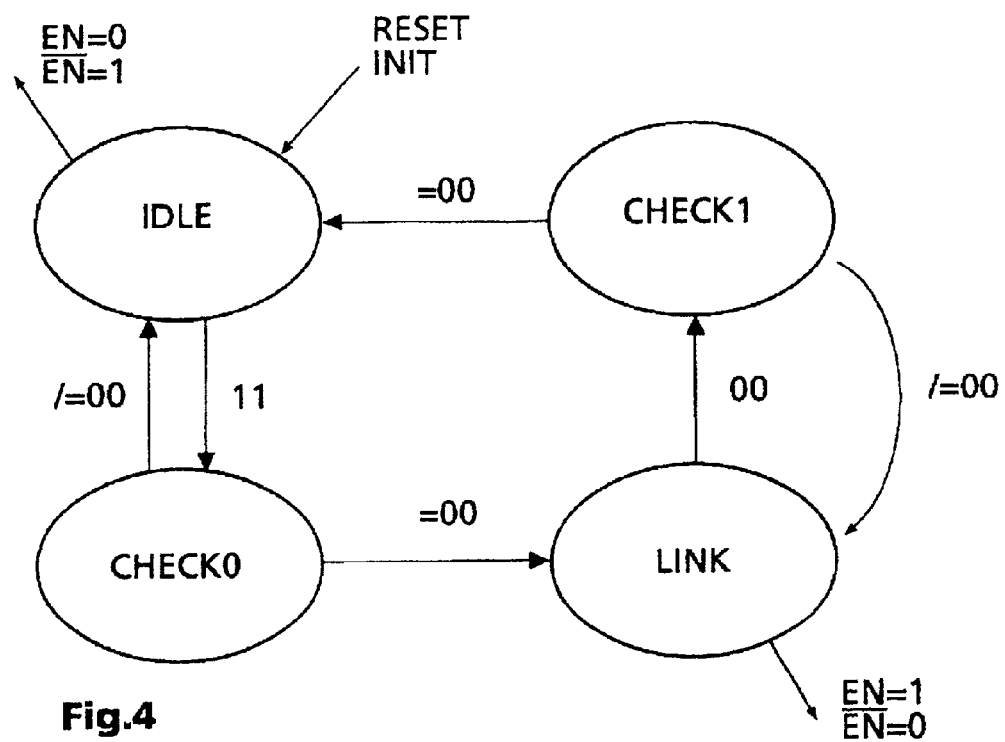
FIG. 4 shows a state diagram of the control unit of the electrical insulation device as shown in FIG. 3.

The IEEE 1394 standard provides for the physical layer module 20 to have control over the bidirectional connecting lines CTL[0:1] and D[0:7]. The data link layer module 10 is permitted to drive these bidirectional connecting lines only when the physical layer module 20 relinquishes its control over these lines to the data link layer module 10. A full explanation of when and how the physical layer module 20 relinquishes its control over the bidirectional connecting lines can be found in Appendix J of the IEEE 1394 standard. A state diagram for the control unit 33, which fulfils the specifications of the IEEE 1394 standard, is shown in FIG. 4 and is explained in more detail below.

Before that explanation, it is also pointed out that the structure shown in FIG. 3 with the tristate drivers 32 and the optocoupler arrangement 31 must be present for each of the bidirectional connecting lines between data link layer module 10 and physical layer module 20, that is to say for the control lines CTL[0:1] and the data lines D[0:7]. For the two unidirectional control lines LREQ and SCLK, simple optocouplers must be present in a complete electrical insulation device, which optocouplers, however, only have to act in one direction in accordance with the unidirectionality of these lines.

That state diagram of the control unit 33 shows 4 states. After a reset or after the initialization of the bus interface, the control unit 33 is put into the state IDLE. In this state, the control unit outputs the logic states EN=0 and $\overline{EN}$=1 as output signals. This is equivalent to the changeover of the left-hand tristate driver 32 of FIG. 3 into the low-impedance state and the changeover of the right-hand tristate driver 32 into the high-impedance state. The signal flow via all the bidirectional lines therefore proceeds from the physical layer module 20 to the data link layer module 10. This state is left if the logic level 1 has been detected in a clock cycle on both control lines CTL[0] and CTL[1]. The control unit 33 is then put into the state CHECK0. It then awaits the state of the two control lines in the next clock cycle. If both control lines have the state logic 0, the control unit 33 is put into the state LINK. In all other cases, the control unit 33 returns to the IDLE state. In the LINK state, the combination EN=1 and $\overline{EN}$=0 is output as output signal. This is equivalent to the relinquishing of control over the bidirectional connecting lines to the data link layer module 10. Consequently, the left-hand tristate driver 32 of FIG. 3 is then put into the high-impedance state and the right-hand tristate driver 32 is switched to the low-impedance state. Thus, the signal flow for all the bidirectional lines then proceeds from the data link layer module 10 to the physical layer module 20. If, in this state, the logic 0 state arises on both control lines CTL [0:1], then the control unit 33 leaves the LINK state and changes over to the CHECK1 state. In this state, a check is made to determine whether the logic state 0 is likewise supplied via both control lines in the subsequent clock cycle. If this is the case, the control unit 33 changes back to the IDLE state. Otherwise, it changes over to the LINK state.

Figure 5:
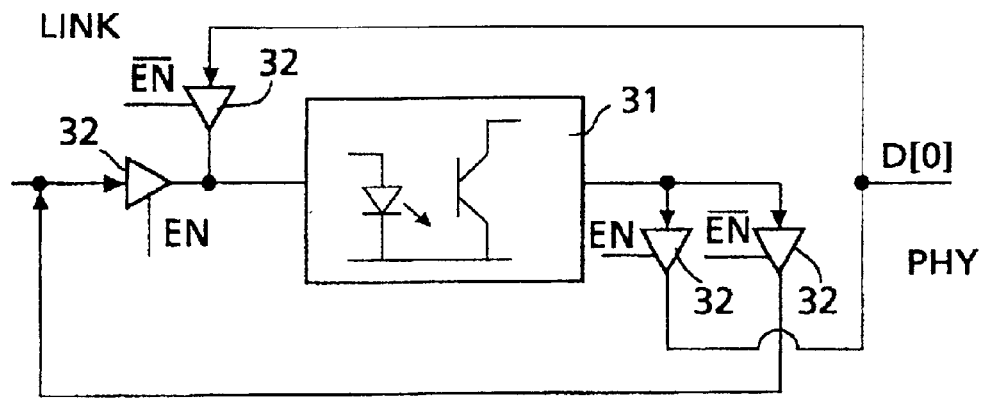
FIG. 5 shows the structure of the electrical insulation device in accordance with a second exemplary embodiment of the invention.
Figure 5:
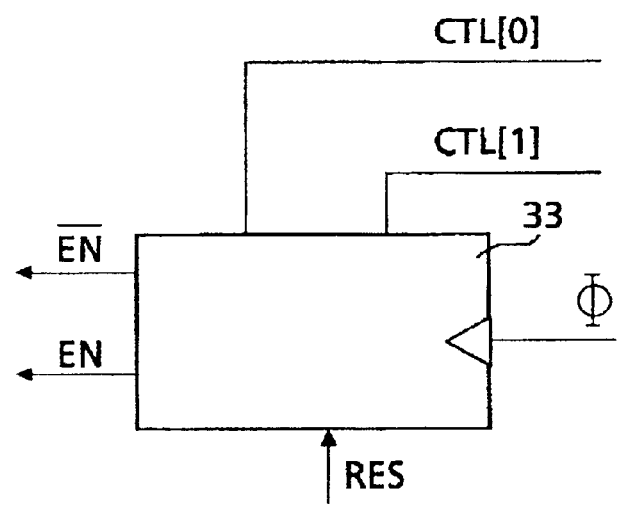

The alternative embodiment of an electrical isolation device according to the invention will now be explained in more detail with reference to FIG. 5. Similar components are designated by the same reference symbols as in FIG. 3. The difference from the solution as shown in FIG. 3 consists in the fact that, in the optocoupler unit 31, only one optocoupler is provided per bidirectional connecting line. However, the effective direction of the said optocoupler is changed over in a manner dependent on the signals on the control lines CTL[0:1]. This is effected by 4 tristate drivers 32 per connecting line. In this case, the control unit 33 is constructed in exactly the same way as in the example of FIG. 3. It functions according to the same state diagram as illustrated in FIG. 4. Thus, in the IDLE state, it will output the logic states 0 and 1 via the lines EN and $\overline{EN}$. As a result, the first of the two tristate drivers 32 on the left-hand side of FIG. 5 is switched in a high-impedance manner and the second tristate driver is accordingly switched in a low-impedance manner. Accordingly, the first of the two tristate drivers on the right-hand side of FIG. 5 is likewise switched in a high-impedance manner and the other in a low-impedance manner. The signal flow is then as follows. The signal flows via the data line D[0] proceeding from the physical layer module 20 as transmitter to the second tristate driver 32 on the left-hand side of FIG. 5 via the optocoupler to the second tristate driver 32 on the right-hand side of FIG. 5 and from there to the data link layer module. In the other state LINK, the logic signals 1 and 0 are output on the lines EN and $\overline{EN}$. This changes over the signal flow. As a result, the data link layer module 10 operates as transmitter. The data pass through the first tristate driver 32 on the left-hand side of FIG. 5, the optocoupler in the optocoupler unit 31, the first tristate driver 32 on the right-hand side of FIG. 5 and pass from there to the input of the physical layer module 20.

The above-described embodiments of an electrical insulation device can be advantageously used not just for the IEEE 1394 bus standard. They can be employed wherever bidirectional connecting lines are intended to be provided with electrical insulation. This problem can also arise in other bus systems.

What is claimed is:

1. Electrical insulation device for a bidirectional connecting line, that connects two electronic circuit units to one another, said electrical insulation unit being located anywhere along the connecting line and comprises at least one optocoupler providing electrical insulation, wherein, either one single optocoupler or two separate optocouplers are provided for the bidirectional connecting line, and in that a control unit is provided, which generates switching signals, which switching signals either change over the effective direction of the single optocoupler with regard to the associated connecting line, or which switching signals activate one of the two optocouplers and deactivate the other optocoupler, for transmission of signals via the associated connecting line in a direction opposite to the previous signal flow direction.

2. Electrical insulation device according to claim 1, the bidirectional connecting line relating either to a data line or a control line.

3. Electrical insulation device according to claim 1, the circuit units which are connected to one another via the connecting line relating to the circuit blocks, data link layer block and physical layer block of a connection interface, in particular IEEE 1394 bus interface.

4. Electrical insulation device according to claim 3, the respective control unit evaluating the control signals on two control lines of the connecting bus between data link layer block and physical layer block in accordance with the IEEE 1394 Standard.

5. Electrical insulation device according to claim 1, tristate drivers, which are switched into corresponding states by the control unit, being used for changing over between the optocouplers or for changing over the effective direction of one optocoupler.

* * * * *